Nov. 10, 1964   F. S. WALKER   3,156,415
SKYLIGHT
Filed March 9, 1962
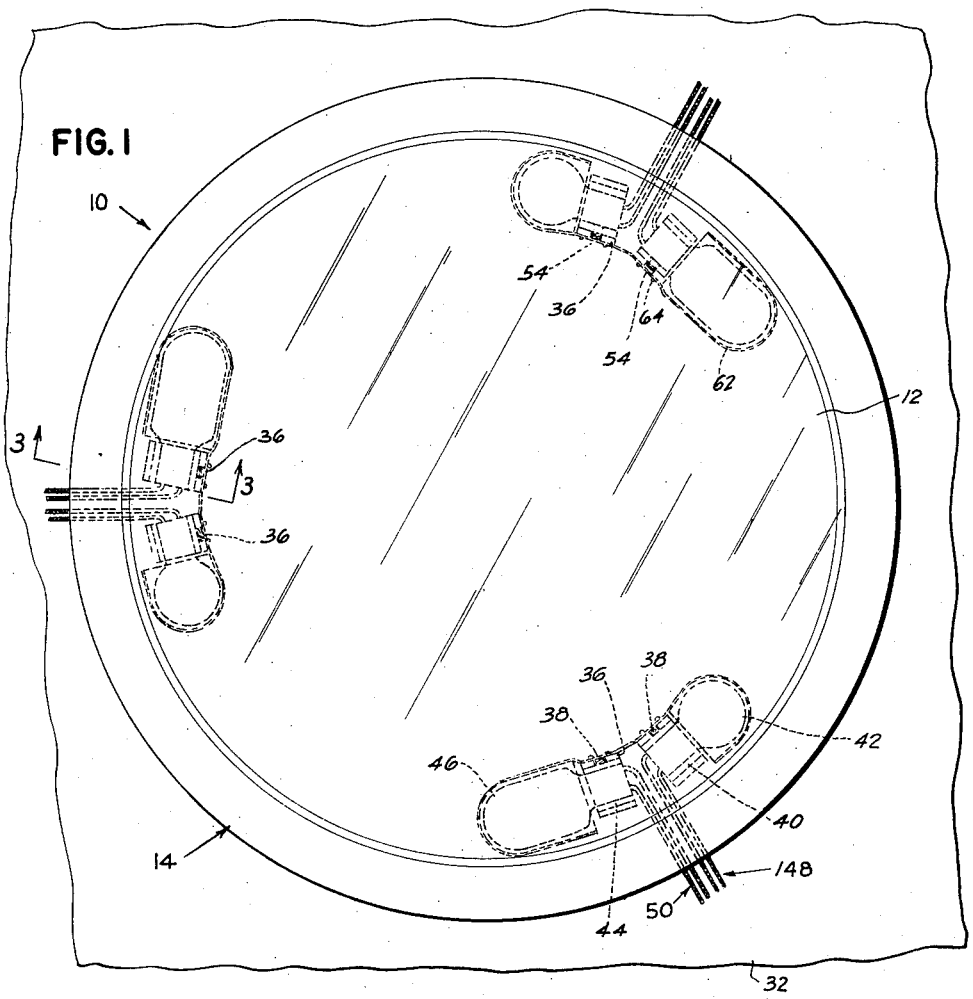
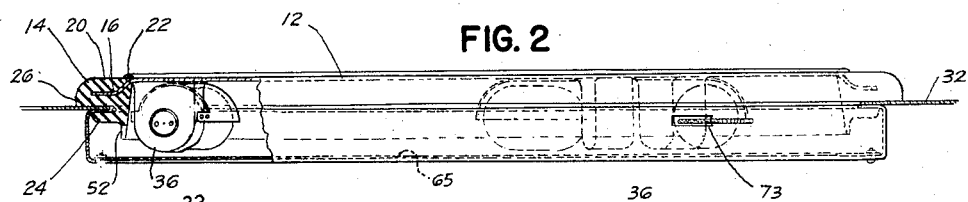
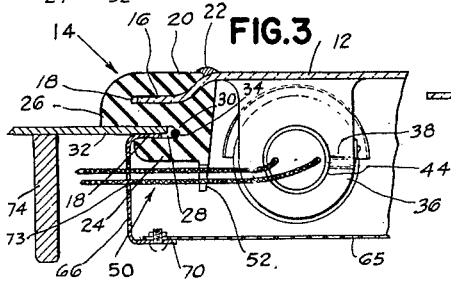
INVENTOR
Frank S. Walker
BY Robert R. Churchill
ATTORNEY

United States Patent Office 3,156,415
Patented Nov. 10, 1964

3,156,415
SKYLIGHT
Frank S. Walker, 57 Salem End Lane, Framingham, Mass.
Filed Mar. 9, 1962, Ser. No. 178,642
3 Claims. (Cl. 240—7.35)

This invention relates to a skylight particularly adapted for installation in the roof of a trailer vehicle or the like.

The invention has for an object to provide a novel and improved skylight of the character specified in which provision is made for adapting the skylight to support artificial lighting elements for use during the nighttime in a simple and efficient manner.

With this general object in view and such others as may hereinafter appear, the invention consists in the skylight hereinafter described and particularly defined in the claims at the end of this specification.

In the drawings illustrating the preferred embodiment of the invention:

FIG. 1 is a plan view of a skylight embodying the present invention;

FIG. 2 is a side elevation of the same partly in cross section;

FIG. 3 is a cross sectional view taken on the line 3—3 of FIG. 1; and

FIG. 4 is a similar view illustrating a modified form of the structure shown in FIG. 3.

In general the present invention contemplates a novel and improved skylight of the type adapted to be installed in the roof of a trailer vehicle or the like for admission of light during daylight hours. In accordance with the present invention, the illustrated skylight is adapted to support artificial lighting elements for use in the nighttime. The supporting means are preferably formed in duplex units formed integrally with the skylight and spaced about and within the periphery thereof. The supporting means are preferably arranged to support electric lamps of different current requirements so that when the trailer is idle one set of lamps may be connected to a 110 volt power source from any convenient outlet, and when the trailer is under way the other set of lamps may be connected to a 12 volt power source from the engine of the truck or other vehicle to which the trailer is connected.

Referring now to the drawings, the present skylight is indicated generally at 10 and includes a transparent or translucent light admitting member 12 of plastic, fiberglass or like material having a rubber rim portion 14 secured to the perimeter thereof. The periphery of the light admitting member 12 is provided with a downwardly and laterally extended flange 16 arranged to be fitted into a grooved portion 18 defined by an upper flap 20 of the rim 14. An elastic sealing bead 22 may be provided at the juncture of the flap 20 and the flange 16 to provide a weathertight seal as shown. The rim portion 14 is provided with a laterally extended, flexible lower flange 24 forming with the upper portion 26 of the rim an annular slot or groove 28. In practice, the flange 24 may be bent downwardly and inwardly to permit entrance of the skylight unit into an opening 30 in the metal roof 32 of the trailer whereupon the flange 24 will flex back to its original position to secure the skylight to the roof. The bottom of the slot 28 may also be provided with a sealing element 34.

As herein illustrated, a plurality of depending lamp supporting extensions 36 molded integrally with the plastic light admitting member 12 are arranged in spaced relation adjacent the periphery of the light admitting member. The lamp supporting extensions 36 are preferably arranged in duplex units of relatively closely spaced extensions, each having an opening 38 therein for receiving the socket portion of an electric lamp extended in opposing directions. One of the sockets 40 of each pair may be adapted to receive a 12 volt lamp 42 for convenience in providing artificial light from the power source of the engine when the trailer is connected, and the other socket 44 may be adapted to received a 110 volt lamp 46 for convenience in providing artificial lighting from an exterior source when the trailer is detached from the truck. Suitable wiring indicated at 48 for the 12 volt circuit and at 50 for the 110 volt circuit may extend through openings cut in a downwardly extended annular portion 52 of the rim 14. The socket portions 42, 44 may be secured in the openings of the supporting extensions 36 either frictionally or by set screws 54 as indicated. In a modified form of the invention, as illustrated in FIG. 4, the supporting extensions may comprise a split bearing having a portion 56 integral with the light admitting member and provided with a cap member 58 secured by screws 60 to the portion 56 to effect clamping of the socket in the extension.

In order to prevent the artificial light from shining upwardly through the light admitting member 12 and also to provide reflectors for lamps, each extension is provided with a light reflecting shield 62 secured to its supporting extension by screws 64 as shown. In the modified form of the invention shown in FIG. 4 the shield may be connected by the split bearing screws 60 as shown. In order to protect the lamps from damage by freight or other articles being transported in the trailer, a wire mesh protective screen 65 may be supported below the skylight unit. As herein shown, the screen 65 may be supported in an annular U-shaped depending bracket 66 having inwardly extended legs, one leg 68 being supported in the groove 28 between the underside of the roof 32 and the lower flange 24. The other leg 70 supports the edge of the wire screen 65 and may be secured thereto by screws 72. Suitable openings 73 are also provided in the bracket 66 for extension of the wires 48, 50. In practice the interior of the roof is provided with bracing ribs 74, and the depth of the skylight unit, including the protective screen, is preferably less than the depth of the bracing ribs, as shown, so as to provide further protection of the unit from damage by the articles being loaded into the trailer.

From the above description it will be seen that the present skylight for a trailer or like vehicle is conveniently adapted to support artificial lighting elements as an integral part of the light admitting unit for use in providing light within the trailer during daylight or in the nighttime.

While the preferred embodiment of the invention has been herein illustrated and described, it will be understood that the invention may be embodied in other forms within the scope of the following claims.

Having thus described the invention, what is claimed is:

1. A skylight for the roof of a vehicle body comprising a circular translucent plastic light admitting member, an annular resilient rim member having a grooved portion in its inner periphery for receiving the outer edge of said light admitting member, and having a grooved portion in its outer periphery fitted over the edges of an opening in the vehicle roof, said plastic member admitting light for lighting the interior of the vehicle in the daytime, and artificial lighting means including means formed integrally with said plastic member and disposed immediately below and adjacent the marginal portion of said plastic member for supporting artificial lighting elements for use in lighting the interior of the vehicle in the night time.

2. The combination as defined in claim 1 which includes means for shielding the artificial lighting means from directing light upwardly through the plastic member.

3. The combination as defined in claim 2 which includes a protective screen supported below said artificial lighting means.

(References on following page)

References Cited in the file of this patent

UNITED STATES PATENTS

| | | | |
|---|---|---|---|
| 1,109,177 | Putnam | Sept. | 1, 1914 |
| 1,236,008 | Rysdon | Aug. | 7, 1917 |
| 2,101,339 | Montroy | Dec. | 7, 1937 |
| 2,165,910 | Trojan | July | 11, 1939 |
| 2,202,888 | Auer | June | 4, 1940 |
| 2,377,449 | Prevette | June | 5, 1945 |
| 3,043,948 | Albinger et al. | July | 10, 1962 |
| 3,113,728 | Boyd | Dec. | 10, 1963 |

FOREIGN PATENTS

| | | | |
|---|---|---|---|
| 250,551 | Switzerland | June | 16, 1948 |
| 634,390 | Canada | Jan. | 9, 1962 |